(12) United States Patent
Subbu et al.

(10) Patent No.: US 6,882,988 B2
(45) Date of Patent: Apr. 19, 2005

(54) SYSTEM AND METHOD FOR TIME-EFFICIENT DISTRIBUTED SEARCH AND DECISION-MAKING USING COOPERATIVE CO-EVOLUTIONARY ALGORITHMS EXECUTING IN A DISTRIBUTED MULTI-AGENT ARCHITECTURE

(75) Inventors: Raj Subbu, Troy, NY (US); Arthur Sanderson, Cohoes, NY (US); Robert Graves, Pelham, MA (US)

(73) Assignee: Rensselaer Polytechnic Institute, Troy, NY (US)

( * ) Notice: Subject to any disclaimer, the term of this patent is extended or adjusted under 35 U.S.C. 154(b) by 261 days.

(21) Appl. No.: 09/971,972

(22) Filed: Oct. 5, 2001

(65) Prior Publication Data

US 2003/0069865 A1 Apr. 10, 2003

(51) Int. Cl.$^7$ .............................. G06E 1/00; G06E 3/00; G06F 15/00; G06F 15/16; G06F 15/18
(52) U.S. Cl. ............................ 706/10; 706/13; 706/12
(58) Field of Search .............................. 706/10, 13, 12

(56) References Cited

U.S. PATENT DOCUMENTS

| | | | |
|---|---|---|---|
| 4,935,877 A | 6/1990 | Koza | |
| 5,148,513 A | 9/1992 | Koza et al. | |
| 5,659,732 A | 8/1997 | Kirsch | |
| 5,761,381 A | 6/1998 | Arci et al. | |
| 5,864,845 A | 1/1999 | Voorhees et al. | |
| 5,864,846 A | 1/1999 | Voorhees et al. | |
| 6,049,819 A | 4/2000 | Buckle et al. | |
| 6,144,989 A | 11/2000 | Hodjat et al. | |
| 6,192,354 B1 | 2/2001 | Bigus et al. | |
| 6,249,714 B1 * | 6/2001 | Hocaoglu et al. | 700/97 |
| 2001/0032029 A1 * | 10/2001 | Kauffman | 700/99 |
| 2003/0051026 A1 * | 3/2003 | Carter et al. | 709/224 |

OTHER PUBLICATIONS

Mitchell A. Potter, A Cooperative Coevolutionary Approach to Fuction Optimization, 1994, Springer–Verlag, Third Parallel Problem Solving from Nature, 1–9.*

F. Seredynski, Coevolutionary Mutli–Agent Systems: the Application to Mapping and Scheduling Problems, 1996, IEEE, 0–780 3104–4, 431–435.*

Designing efficient and accurate parallel genetic algorithms, Author: Cantu–Paz, Erick, Dissertations, pp. 00153, 1999.

A Statistical Study of a Class of . . . Algorithms, Mathieu Capcarrère et al., Evolutionary Computation 7(3): 255–274, 1999.

Natural and Social System . . . to Issue, B. Chandrasekaran, IEEE Transactions on Systems, Man, and Cybernetics. vol. SMC–11, No. 1, Jan. 1981.

Experiments with an ecosystems model . . . planning, Philip Husbands, Malcolm McIlhagga and Robert Ives, Handbook of Evolutionary Computation, G9.5:1–G9, 5:7, 1995.

A Retrospective View of FA/C . . . Solving, Victor R. Lesser, Member, IEEE, IEEE Transactions on Systems, Man Etc. vol. 21, No. 6 Nov./Dec. 1991.

Functionally Accurate, Cooperative Distributed Systems, Victor R. Lesser and Daniel D. Corkill, IEEE Transactions Etc., vol. SMC 11, No. 1, Jan. 1981.

(Continued)

*Primary Examiner*—Anthony Knight
*Assistant Examiner*—Joseph P. Hirl
(74) *Attorney, Agent, or Firm*—Notaro & Michalos P.C.

(57) ABSTRACT

A method and architecture for efficiently solving complex distributed problems uses coevolutionary agents incorporating evolutionary algorithms located at different nodes in a distributed network. The coevolutionary agents conduct localized database searches and evolve at their respective nodes while sharing information with other coevolutionary agents working the same problem. Results or solutions to the problem posed are available at each network node containing a coevolutionary agent working the problem.

16 Claims, 3 Drawing Sheets

OTHER PUBLICATIONS

A Parallel and Distributed Genetic Algorithm . . . Multiprocessor Systems, Takashi Matsumura et al., IEICE Trans. Fund. vol. E81–A, No. 4, Apr. 1998.

Evolution in Time and Space—The Parallel Genetic Algorithm, Heinz Muhlenbein, In Gregory J. E. Rawlins, Ed., Foundations of Genetic Algorithms. Morgan Kaufmann, 1991.

Objectspace Voyager—ORB 3.3 Developer Guide, © 1997–2000 Object Space.

Parallel Combinatorial Optimization . . . Processsors, J. Ortega et al., IEEE Congr. on Evolutionary Computation Washington D.C. © 1999, pp. 1051–1058.

The Design and Analysis of a Computational . . . (Genetic Algorithms, Machine Learning), Potter, Mitchell A., 1997, pp.: 00215 (Database Dissertations).

Cooperative Coevolution: An Architecture . . . Coadapted Subcomponents, Mitchell A Potter et al. Evolutionary Computation 8(1): 1–29, © 2000.

Coevolutionary Search among adversaries (Genetic Algorithm, Game Theory, Go), Rosin, Christopher Darrell, 1997, pp. 00214, Database: Dissertations.

Competitive Coevolutionary Multi–Agent Systems: The Application to Mapping and Scheduling Problems, Franciszek Seredynski, Journal of Parallel and Distr. Computing 47, 39–57 (1997) Article No. PC971394.

The Contract Net Protocol: High–Level Communication and . . . Solver, Reid G. Smith, IEEE Transactions on Computers, vol. C–29, No. 12, Dec. 1980.

Frameworks for Cooperation in Distributed Problem Solving, Reid G. Smith et al., IEEE Transactions on Systems, Man Etc., vol. SMC–11, No. 1, Jan. 1981.

CAMnet: Architecture and Applications, Michael W. Sobolewski et al., Concurrent Engineering: A Global Persp. CE 95 Conferene, pp. 627, 628, 633, 634.

A Virtual Design Environment . . . Agents, Raj Subbu et al., 1998 IEEE Intern. Conf. on Robotics and Automat., Leuven, Belgium, May 16–21, 1998.

Modeling and Convergence . . . lgorithms, Raj Subbu et al., 2000 IEEE Int. Congress on Evolutionary Computation, San Diego, USA, Jul. 16–19, 2000.

Network–Based Distributed . . . Manufacturing, Raj Subbu et al. In Proceedings of the IEEE Int. Symposium on Assembly and Task Plg., Fukuoka, Japan, 2001.

Network Distributed Virtual . . . Agents, Raj Subbu et al., In Proceedings of the IEEE Int. Conf. on Robotics and Automation, Seoul, Korea, 2001.

Evolutionary Decision Support . . . Product Manufacturing, Raj Subbu et al., Production Planning & Control, 1999, Vol. 10, No. 7, 627–642.

Distributed Constrained Heuristic Search, K. Sycara, et al., IEEE Transactions on Systems, Man, Etc., vol. 21, No. 6, Nov./Dec. 1991.

Distributed Genetic . . . Optimization (Algorithms), Tanese, Reiko, 1989, pp. 00164 OCLC First Search—Detailed Record.

\* cited by examiner

SYSTEM AND METHOD FOR TIME-EFFICIENT DISTRIBUTED SEARCH AND DECISION-MAKING USING COOPERATIVE CO-EVOLUTIONARY ALGORITHMS EXECUTING IN A DISTRIBUTED MULTI-AGENT ARCHITECTURE

This invention was developed in part using funding under National Science Foundation grants DMI-9320955 (Agile Manufacturing) and DMI-0075524 (Scalable Enterprise Systems), and the United States government may have rights in this invention.

FIELD AND BACKGROUND OF THE INVENTION

The present invention relates generally to the field of distributed decision problem solving and to problems which require information retrieved from multiple, logically interrelated, distributed databases. More specifically, the invention relates to utilization of co-evolutionary algorithms executing in a distributed information architecture having co-evolutionary agents and mobile software agents for performing the problem solving in a network-efficient manner.

Previous work at the Electronics Agile Manufacturing Research Institute (EAMRI) at Rensselaer Polytechnic Institute has recognized the critical role which information infrastructure plays in the design and manufacturing organizations. Research at EAMRI has resulted in the development of a virtual design module, described in U.S. Pat. No. 6,249,714, for using evolutionary agents emanating from a central location to produce optimized designs.

An understanding of evolutionary algorithms and distributed problem solving methods is helpful to the discussion of the invention.

Evolutionary algorithms (EAs) include genetic algorithms, evolutionary programming, evolution strategies and genetic programming. Genetic algorithms are discussed in David E. Goldberg, "Genetic Algorithms In Search, Optimization, and Machine Learning." Addison-Wesley, Massachusetts 1989 and John H. Holland, "Adaptation in Natural and Artificial Systems: an introductory analysis with applications to biology, control, and artificial intelligence." The MIT Press, Cambridge, Mass., 3d ed. 1994. L. J. Fogel et al., "Artificial Intelligence Through Simulated Evolution." John Wiley, New York 1966, provide a good explanation of evolutionary programming. More detail about evolution strategies is found in Thomas Back, "Evolutionary Algorithms in Theory and Practice." Oxford University Press, New York 1996. J. Koza, "Genetic Programming: On the programming of computers by means of natural selection." The MIT Press, Cambridge, Mass. 1992 provides information about the title topic.

The principles of each of these related techniques define a general paradigm that is based on a simulation of natural evolution. Evolutionary algorithms perform their search by maintaining at any time t a population: $\mathcal{P}(t)=\{P_1(t), P_2(t), P_3(t), \ldots, P_p(t)\}$ of individuals. Genetic operators that model simplified rules of biological evolution are applied to create a new and desirably more superior population $\mathcal{P}(t+1)$. The genetic evolution process continues until a sufficiently good population is achieved, or some other termination condition is satisfied.

Each $P_i(t) \in \mathcal{P}(t)$ represents, via an internal data structure, a potential solution to the original problem. Choice of an appropriate data structure for representing solutions is very much an art, rather than a science, due to the plurality of data structures suitable for a given problem. However, choice of an appropriate representation is often a critical step in a successful application of evolutionary algorithms. Effort is required to select a data structure that is compact, minimally superfluous, and can avoid creation of infeasible individuals in the population.

As an example, if the problem domain requires finding an optimal integer vector from the space defined by dissimilarly bounded integer coordinates, it is more appropriate to choose as a representation an integer-set-array instead of a representation capable of generating bit strings. An integer-set-array is an array of bounded sets of integers, while a representation that generates bit strings can create many infeasible individuals, and is certainly longer than a more compact sequence of integers.

Closely linked to choice of representation of solutions, is the choice of a fitness function: $\psi: \mathcal{P}(\cdot) \to \mathbb{R}$, that assigns credit to candidate solution. Individuals in a population are assigned fitness values according to some evaluation criterion. Fitness values measure how well individuals represent solutions to the problem. Highly fit individuals are more likely to create offspring by recombination or mutation operations. Weak individuals are less likely to be selected for reproduction, and so they eventually die out. A mutation operator introduces genetic variations in the population by randomly modifying some of the building blocks of individuals.

Evolutionary algorithms are essentially parallel by design, and at each evolutionary step a breadth search of increasingly optimal subregions of the options space is performed. Evolutionary search is a powerful technique of solving problems, and is applicable to a wide variety of practical problems that are nearly intractable with other, conventional optimization techniques. Practical evolutionary search schemes do not guarantee convergence to the global optimum in a predetermined finite time, but they are often capable of finding very good and consistent approximate solutions. However, they are shown to asymptotically converge under mild conditions, as described in R. Subbu et al., "Modeling and convergence analysis of distributed coevolutionary algorithms," Proceedings of the IEEE Congress on Evolutionary Computation, San Diego, Calif. 2000 and R. Subbu, "Network Decision Support based on Distributed Coevolutionary Algorithms," PhD thesis, Rensselaer Polytechnic Institute, Troy, N.Y. 2000.

Distributed coevolutionary computations are a further innovation of evolutionary algorithm problem solving. Parallel and distributed implementations of evolutionary algorithms typically follow a coarse-grained approach of evolving independent populations on multiple nodes and occasionally migrating individuals between nodes. Alternatively, the fine-grained approach can be used in which individuals are distributed among multiple nodes where they have localized interactions. These approaches are discussed in greater detail in M. Capcarrere et al., "A statistical study of a class of cellular evolutionary algorithms," Evolutionary Computation vol. 7, issue 3, 1999.

In each of the coarse- and fine-grained methods, each node in the system can potentially directly manipulate variables in all n dimensions. These models have primarily been pursued for the purpose of speeding computations in large-scale problems and for simultaneously alleviating the problem of premature convergence.

Coevolutionary algorithms are distributed and consist of distinct distributed algorithm components that considered together follow various models of cooperation or competition. In this model, different subspaces of the feasible space are explored concurrently by the algorithm components. If a problem is such that the subproblem solved by each algorithm component is independent of the others, that is, the problem is decomposable, then each algorithm component can evolve without regard to the other components. From the perspective of optimization analysis, in such cases, each algorithm component optimizes in a landscape disjoint from the landscapes corresponding to the other algorithm components.

However, many problems exhibit complex interdependencies, and from a coevolutionary perspective, it has been suggested that the effect of changing one of the interdependent subcomponents leads to a deformation or warping of the landscapes associated with each of the other interdependent subcomponents. Kauffman et al. discuss this theory in "Co-evolution to the edge of chaos: Coupled fitness landscapes, poised states, and co-evolutionary avalanches," Artificial Life II, 1990. Recent studies have increased the interest in application of coevolutionary systems to problem solving.

Husbands et al., "Experiments with an ecosystems model for integrated production planning" Handbook of Evolutionary Computation, Edited by Back et al., Oxford University Press 1997, propose a coevolutionary distributed genetic algorithm for integrated manufacturing planning and scheduling. In this scheme, each species concentrates on identifying a feasible set of process plans for a single component to be manufactured. The species interact because they utilize shared manufacturing resources. The individual fitness functions of each species take into account the need to utilize shared resources, and are based on various manufacturing costs. In order to resolve conflicts between species, an arbitrator species is simultaneously evolved. The fitness of the arbitrator species depends on its ability to resolve conflicts such that manufacturing delays are minimized. The individuals in each species compete internally in order to generate good process plans, and species compete at a higher level for shared manufacturing resources.

Others, especially Potter et al., "Cooperative Coevolution: an Architecture for Evolving Coadapted Subcomponents," Evolutionary Computation, vol. 8, issue 1, 2000, have proposed a coevolutionary model in which multiple species evolve independently, enter into temporary collaborations with certain members of the other species, and are rewarded based on the success of the collaboration in solving a problem. A collaboration of all species is required to realize a coherent and complete problem solution. In this model, typically the best individual from each species is chosen as the representative that will collaborate with individuals of the other species. Thus, for evaluating the fitness of each individual in a given species, the best representatives from each of the other species are utilized to form the complete solution, following which the solution is evaluated. The fitness is assigned strictly to the individual being evaluated and is not shared with the representatives from the other species that participated in the collaboration. This method which utilizes only the best individual from each population for fostering across-species collaborations could be characterized as "greedy", due to the lack of sharing between representatives. The greedy method is effective in its way because of its simplicity. However, this simple pattern of interaction between species leads to entrapments in local optima. Other collaborations schemes that include random selections of representatives are also possible, and lead to improved results over the "greedy" method.

A competitive coevolutionary model applicable to scheduling problems is proposed by F. Seredynski, "Competitive coevolutionary multi-agent systems: The application to mapping and scheduling problems," Journal of Parallel and Distributed Computing, vol. 47, issue 1, 1997. Seredynski considers game-theoretic models of limited interaction between individuals in competing populations. Individuals in a population have limited interaction with individuals in the neighboring populations, and seek to maximize their fitness based on local evaluations. Seredynski demonstrates the successful emergence of global behaviors achieved purely through local cooperation.

Coevolutionary approaches that follow a clearly adversarial model are based on the biological belief that an adaptive change of a species introduces a new challenge to the competing species. The challenge of the first change then causes a second adaptive change by the competing species, which in turn causes a response in the first species and so on. See, C. D. Rosin, "Coevolutionary Search Among Adversaries," PhD thesis, Univ. of Calif. San Diego, San Diego, Calif. 1997. In these adversarial systems, the fitness of an individual in a population is based on a competition with members from the other population. Rosin has applied the adversarial coevolutionary model to various problems, including for instance, to the design of drugs that are robust across some drug resistance mutations, and to game playing.

Distributed problem solving (DPS) is another problem solving method in which a cooperative solution to a problem is generated by loosely coupled agents operating according to a decentralized computational model. In this case, loosely coupled means that the agents spend the majority of their time computing and working the problem rather than communicating with other agents. The distributed problem solving model does not have a centralized data store, and no one agent has enough information to make a complete decision. Each agent in the system requires assistance from at least one other agent in the decision-making process. Further, agents may be physically and logically distributed over a computing environment. The problem is solved by intelligently combining subproblems solved by agents into an overall solution.

The fundamental areas of interest in distributed problem solving are the decomposition and coordination of computation among a society of agents so that structural demands of the task domain are matched. See, B. Chandrasekaran, "Natural and social system metaphors for distributed problem solving: Introduction to the issue," IEEE Transactions on Systems, Man, and Cybernetics, SMC-11 (1), 1981.

One of the earliest projects in distributed problem solving is the Contract-Net-Protocol, described in Smith, "The contract net protocol: High-level communication and control in a distributed problem solver, " IEEE Transactions on Computers, C-29 (12), 1980 and Smith et al., "Frameworks for cooperation in distributed problem solving," IEEE Transactions on Systems, Man, and Cybernetics, SMC-11 (1), 1981. In Contract-Net-Protocol, computing nodes coordinate their activities through contracts. A "manager" node announces a task for which multiple eligible "contractor" nodes respond with bids. Contractor nodes receive pieces of the contract after a negotiation process, and in case a contractor requires assistance with its part of the problem, it assumes the role of a manager and subcontracts its part of the problem to other nodes. The original problem is solved in a top-down manner by a network of contractor nodes. The method for task decomposition is specified a priori, and the Contract-Net framework is best suited to problems that can be hierarchially decomposed into nearly independent subtasks.

Others have proposed DPS systems which work effectively despite inconsistencies. See, Lesser et al., "Functionally accurate, cooperative distributed systems," IEEE Transactions on Systems, Man, and Cybernetics, SMC-11 (1), 1981. In the "functionally accurate, cooperative" approach proposed by Lesser et al., nodes cooperatively exchange and integrate partial and tentative results to construct a complete solution. Nodes make progress in problem solving by using whatever information they can find. This work is motivated by the argument that consistency maintenance at all times is very expensive in practical systems. This model, however, leads to the possibility that agents might propagate and use incorrect partial results leading to unpredictable system performance.

In Lesser, "A retrospective view of FA/C distributed problem solving," IEEE Transactions on Systems, Man, and Cybernetics, vol. 21, issue 6, 1991, the issue of functionally accurate cooperative distributed problem solving is revisited. Lesser presents some techniques that may reduce the unpredictability of systems that propagate and use incorrect partial results. Lesser proposes an increase in sophistication of local control in each agent so available information about a local search is more efficiently utilized, the exchange of meta-level information between agents so their local searches can be made while having a more global view, and satisfying control, in which less than optimal, but acceptable, levels of coordination between agents are used.

Another approach provides an architecture for solving distributed search problems using heuristics and constraint satisfaction methods, and applies it to decentralized job-shop scheduling. See, Sycara et al., "Distributed constrained heuristic search," IEEE Transactions on Systems, Man, and Cybernetics, vol. 21, issue 6, 1991.

One application in particular for distributed problem solving is the design and fabrication of new products. Only ten or fewer years ago, the designing, testing and manufacturing of products took place within the homogeneous environments of relatively large companies. Now, more often than not, the fabricating, assembling and testing of new products happens in widely distributed and radically different settings. The product designer, component suppliers, and manufacturers are often many miles apart, and sometimes separated by countries and continents. The computing systems used by each group are often different, using different CAD/CAM systems and different computer platforms from PC's to workstations to communicate with each other. Despite the best efforts of all involved, there are usually delays in filling orders, the end-products are more costly, less reliable and take longer to make than is possible.

Although advanced network backbones and technologies for communications exist, new product design and fabrication has in some ways seemed to remain a manual process. Many times an optimal product may be designed by engineers who then transmit their design to suppliers for cost estimates and manufacturing reviews, which reveal that the design is far from optimal in cost and production time.

Some e-engineering systems are beginning to improve the design and realization processes. Some systems rely upon collaborative design processes by providing shared design files and collaborative design development among distributed engineering participants. Other systems provide for rapid communications and file transfers for design assessment and checking among distributed design contributors including potential customers as well as fabrication services and other supply chain contractors. Still other systems merely provide access to databases with time-critical data needed by design engineers.

Unfortunately, each of these prior art approaches are limited solutions to the inherently complex and coupled problem of making ideal design, supplier and manufacturing choices with respect to multiple criteria including cost and time. Fundamental to this complexity is that each choice or assignment has the potential to affect overall product cost, time to manufacture and distribute, and therefore assignments cannot be considered independent of one another. This complexity makes it increasingly impossible to make these selections based purely on prior art techniques.

The Virtual Design Environment class of systems automates significant portions of the overall decision task by accessing information available at multiple, logically interrelated, distributed databases and evaluating and consequently optimizing the assignments. These systems rely heavily on the underlying network infrastructure and middle-ware to radically alter the design development and realization process.

The Virtual Design Environment (VDE) described in U.S. Pat. No. 6,249,714 and developed in part by the inventors of this invention is a distributed, heterogeneous information architecture having centralized evolutionary computations. The VDE uses evolutionary agents, modular computer programs that generate and execute queries among distributed computing and database resources and support a global optimization of integrated design-supplier-manufacturer planning decisions.

A prototype VDE has been evaluated using design and supplier data based on a real commercial electronic circuit board product for Pitney Bowes of Stamford, Conn., and data from three commercial manufacturing facilities. The VDE simultaneously selects parts for a design, selects suppliers for the parts and makes manufacturing decisions. Suppliers and manufacturing resources are distributed, and information about parts, suppliers and manufacturing resources is available through network databases. During the course of the evolutionary optimization, the VDE generates virtual designs, or complete integrated planning decisions, that are evaluated against an evaluation function based on cost and time models. These computations require information collected dynamically over the network. As the evolution proceeds, successive generations of virtual designs are created, and the population systematically converges towards promising integrated planning decisions.

The VDE functions in a network environment with distributed information sources that need to be accessed for decision-making. In this network environment, inter-node communication delays are a primary factor in system performance. The prototype VDE is conceptually based on a centralized optimization model, where computation is performed only at one node, while information resident at various network nodes is frequently accessed in order to perform fitness evaluations of the alternative planning decisions. Such a centralized planner that requires information from multiple network-distributed databases is prone to large delays due to remote access latencies.

Thus, there is a need to provide an effective problem solving system which overcomes these delays while providing the functionality of the VDE.

SUMMARY OF THE INVENTION

It is an object of the present invention to provide a new method and architecture for solving complex problems using a class of efficient and scalable algorithms in a distributed network environment.

It is a further object of the invention to provide a method and system for solving problems using coevolutionary algorithms in a distributed network having multiple nodes in which a solution to a given problem can be obtained from any node in the system.

Accordingly, a class of efficient and scalable algorithms incorporating rules of natural selection is adapted to a networked architecture for performing a distributed network-based search and consequential decision making. The algorithms are applied at each node in a logical cluster of nodes. In alternating manner, the algorithms are applied using information available in local databases connected to each node, followed by transferring information between nodes using mobile agents. An optimized solution is produced from available information quickly and efficiently by evolutionary agents performing local operations at their respective nodes and swapping progressively increasing optimized information between evolutionary agents at different nodes using mobile agents.

In accordance with a method of the invention, a distributed network architecture has one or more logical clusters containing nodes. Coevolutionary agents are programmed with evolutionary algorithms at each node relevant to the problem being solved throughout the architecture. The coevolutionary agents perform local searches of available information, following which they swap information between nodes according to one of six schemes, using mobile agents to transmit information. The local searching and information swapping are repeated to eventually produce an optimized result which can be obtained from any node in the architecture actively working on the problem.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

In centralized mode of operation, such as described in U.S. Pat. No. 6,249,714, a network distributed search and design application using evolutionary agents has one node where an evolutionary agent is resident. The remaining nodes in the network participate in the search by simply providing information to the evolutionary agent upon request. In this mode, a search of the full space of the system takes place from only the one node occupied by the evolutionary agent, while the remaining nodes simply respond to queries from the agent. Based on the responses received, the evolutionary agent creates and evaluates virtual designs, and uses proportional selection and stochastic variational operations to evolve virtual designs for evaluation.

The present invention, by contrast, provides a solution method and architecture in which multiple evolutionary agents operating at different, distributed nodes all work to solve the same problem simultaneously.

Figure 1:
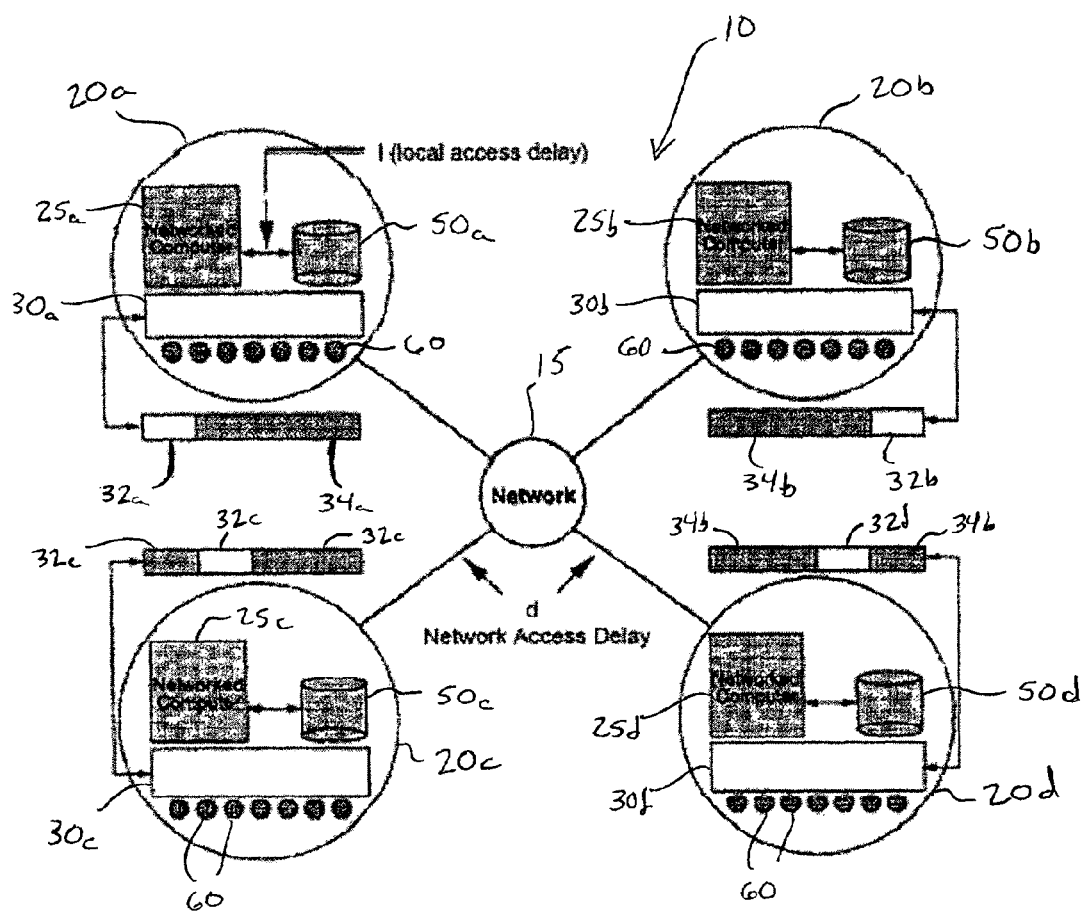
FIG. 1 is a schematic diagram of a distributed network architecture supporting the problem solving method of the invention.

Referring now to the drawings, in which like reference numerals are used to refer to the same or similar elements, FIG. 1 illustrates a distributed network architecture 10 for supporting multiple coevolutionary agents 30$a$, 30$b$, 30$c$, 30$d$ spread among several nodes 20$a$, 20$b$, 20$c$, 20$d$. Each node 20$a$–20$d$ includes a networked computer 25$a$–25$d$, a connected local database 50$a$–50$d$, an evolutionary agent 30$a$–30$d$ and several mobile agents 60.

Each of the nodes 20$a$–20$d$ shown in FIG. 1 may be a member of a logical cluster of nodes networked together in a local network, as will be further described herein. Further, while only four nodes 20$a$–20$d$ are illustrated, there may be as few as 2 nodes and up to any number of nodes which can actively work together on the same network.

The evolutionary agents 30$a$–30$d$ are actually co-evolutionary agents because they can evolve simultaneously with each other, using some overlapping information and some unique information. Each evolutionary agent 30$a$–30$d$ includes primary search variables 32$a$–32$d$ and secondary search variables 34$a$–34$d$. The search variables 32$a$–32$d$ and 34$a$–34$d$ are partitioned among the evolutionary agents 30$a$–30$d$. The evolutionary agent 30$a$–30$d$ at each of the nodes 20$a$–20$d$ performs a local evolutionary search using its corresponding primary search variable 32$a$–32$d$. The local evolutionary search is based on local and rapidly accessible information from the corresponding local database 50$a$–50$d$. During the local evolutionary search, the secondary variables 34$a$–34$d$ are clamped, or held constant.

Following execution of the local evolutionary search, the secondary variables 34$a$–34$d$ at each node 20$a$–20$d$ are updated by intercommunication between the nodes 20$a$–20$d$. Mobile agents 60 are used to effect the intercommunication between the nodes 20$a$–20$d$ by carrying information from an originating node to a destination node. The mobile agents 60 provide missing computational functionality at the nodes 20$a$–20$d$ where they migrate.

The local search phase and intercommunication phases are alternated to produce a cooperative search by coevolutionary algorithms embodied in coevolutionary agents spread among a distributed network of nodes 20$a$–20$d$, guided by the same objective search function.

The evolutionary agent 30$a$–30$d$ at each node 20$a$–20$d$ performs the following functions. Each evolutionary agent 30$a$–30$d$ implements a local evolutionary algorithm that searches over the subspace corresponding to locally available information in the local database 50$a$–50$d$. Each evolutionary agent 30$a$–30$d$ initializes using appropriate information that permits the agent 30$a$–30$d$ to do local decision-making. The evolutionary agents 30$a$–30$d$ each generate and execute queries on the corresponding local database 50$a$–50$d$. Finally, the evolutionary agents 30$a$–30$d$ co-exist in a pool of evolutionary agents, and participate in coordinating a global computation of a given problem via interactions with other ones of the evolutionary agents 30$a$–30$d$ and mobile agents 60.

The coordination of the evolutionary agents 30$a$–30$d$ is most critical, since a coordination operation essentially provides an updated view of the local information from a certain node 20$a$–20$d$ to another of the nodes 20$a$–20$d$ where that information is not currently available locally. That is, the coordination function permits the several evolutionary agents 30$a$–30$d$ to co-extensively evolve based on their local searches, while being fed new information from other nodes 20$a$–20$d$ between searches.

When more than one node exists in a logical cluster of nodes 20$a$–20$d$, the virtual designs generated by each node 20a–20d in the logical cluster compete with each other during the coordination operation. This function allows local solutions generated by the evolutionary agents 30a–30d at each of the nodes within a logical cluster to compete against all of the other local solutions produced. Further, the subproblems solved by each node 20a–20d in a logical cluster are different, despite being functionally similar. That is, the subproblems are different because of the differences in local resources, such as local databases 50a–50d, available to each evolutionary agent 30a–30d, and each evolutionary agent 30a–30d searches over a different, smaller space of the whole search space of planning decisions. The coevolutionary algorithms embodied in coevolutionary agents 30a–30d have no direct means to search the full space of all planning decisions in the network architecture 10.

While a single, centralized evolutionary agent compiles a list of all available decision resources at all nodes and explicitly searches the full space of planning decisions, such an operation can be slow and time-consuming in a distributed network environment. In contrast, the distributed co-evolutionary model of the invention allows each agent 30a–30d at each node 20a–20d to explore the full space of planning decisions using an information splicing operation in which information from each of the other nodes 20a–20d carried by mobile agents 60 is stochastically combined at the first node 20a–20d. The stochastic information splicing may be viewed as a crossover operation for combining information from the nodes 20a–20d.

It is possible that as a practical matter, at some local nodes in a logical cluster of networked nodes, the evolutionary agents will not achieve convergence with the overall solution being produced by the other evolutionary agents as part of a global solution. This is inevitable to a distributed coevolutionary processing problem as some evolutionary agents will not have sufficient local information or useful local information for solving the global problem. In such case, evolutionary algorithms in the evolutionary agents will eliminate designs produced from the non-converging nodes as unsuitable for further consideration, while the remaining nodes with good local information and advantageous resources for solving the global problem will continue to evolve to produce a solution accessible at substantially any one of the nodes 20a–20d in the architecture 10.

As an example of an evolutionary algorithm which can be adapted for use with the distributed computation of the invention, let $\chi$ be the decision space. Then, $x \in \chi$ is the variable vector, and $x=(x_1, x_2, x_3, \ldots, x_p)$ represents a partition of the vector into p blocks. At any node i, $x_i$ is its primary variable set 32a–32d, while $\bar{x}_i$ is the secondary variable set 34a–34d. Given a feasible space $\chi$ and a variable distribution, the evolutionary agent at each node i performs a local evolutionary search in its primary subspace $\chi_i$, and so $\chi$ is the product space $\chi = \Pi^p_{i=1} \chi_i$. $(x^*_i|\bar{x}_i) = \arg \min[x_i \in \chi_i] \psi(x|\bar{x}_i)$ is the optimizer in the restricted space $(\cdot|\bar{x}_i)$. The evolutionary search in the primary subspace of each node i utilizes proportional selection and stochastic variational operations.

Each evolutionary search described above is initialized with a randomly selected complete vector of variables $x_g$. Mobile agents facilitate the broadcast of this vector to all nodes 20a–20d in the network architecture 10. The evolutionary search starting from this point may be represented by the mapping $T_i: \chi \to \chi_i$ that generates the sequence:

$$x_{(i,g+m+1)} = Ti(x_{(1,g)}, \ldots x_{(i-1,g)}, x_{(i,g+m)}, x_{(i+1,g)}, \ldots, x_{(p,g)}), m \geq 0$$

Then, as m increases:

$$x_g^{(i)} = (x_{(1,g)}, \ldots x_{(i-1,g)}, x_{(i,g+m)}, x_{(i+1,g)}, \ldots, x_{(p,g)})$$

and $x_g^{(i)}$ converges to $(x^*_i|x_i)$, where $x_g^{(i)}$ is the result of m generations of evolutionary search at node i, starting from point $x_g$.

Now, let $Z_g = \{x_g, x_g^{(1)}, \ldots, x_g^{(p)}\}$ be a set of local results and the vector $x_g$, and let $S: \chi \to \chi$ represent the computation that selects that vector from $Z_g - x_g$ which has the highest fitness and makes it the new iterate $x_{g+1}$ only if its fitness is greater than that of $x_g$. Otherwise, $x_{g+1} = x_g$. The computation $x_{g+1} = S(x_g)$ represents a global iteration that encapsulates the combined m-step local search at each node and the intercommunication operation, or coordination, that facilitates selection and update of new iterates. From the architectural perspective, mobile software agents 60 facilitate the coordination by transferring necessary information between coevolutionary agents 30a–30d.

There are presently six preferred distributed coordination schemes, each of which uses information splicing. The schemes are referred to as local, joint, pool, elite local, elite joint and elite pool.

The implementation of information splicing takes p vectors of the same dimension and creates a vector such that each of its coordinates is a random selection from the set of p coordinates along the same dimension. To help describe the coordination schemes, the following assumptions are made: 1) the network environment has p network nodes; 2) $x_g^{(i)}$ is the best vector from node i at generation g; 3) $\{x_g^{(i)}\}$ is a set of vectors from node i at generation g; 4) $\{x_g'\}$ is a set of randomly created vectors at generation g; and 5) $y_g$ is the vector obtained by combining the best local result portions from each node.

The six coordination schemes can then be described as follows.

In the local coordination scheme, from the set $\{x_g^{(1)}, \ldots, x_g^{(p)}, \{x_g'\}\}$, select the best one as the new global iterate. The set $\{x_g'\}$ consists of p elements created by splicing from the set $\{x_g^{(1)}, \ldots, x_g^{(p)}\}$.

The joint coordination scheme has the set $\{x_g^{(1)}, \ldots, x_g^{(p)}, \{x_g'\}\} \cup y_g$ from which the best is selected as the new global iterate. The elements of set $\{x_g'\}$ are the same as in the local coordination scheme.

For the pool coordination scheme, from the set $\{\{x_g^{(1)}\}, \ldots, \{x_g^{(p)}\}, \{x_g'\}\}$ select the best as the new global iterate. Each set $\{x_g(i)\}$ represents t=5 top performers from each node i, and the set $\{x_g'\}$ is created as described above for the local and joint schemes from a set of size (t×p) rather than a set of size p.

For the elite local scheme, from the set $x_g \cup \{x_g^{(1)}, \ldots, x_g^{(p)}, \{x_g'\}\}$, select the best as the new global iterate where $x_g$ is the previous global iterate.

In the elite joint scheme, select the best from the set $x_g \cup \{x_g^{(1)}, \ldots, x_g^{(p)}, \{x_g'\}\} \cup y_g$ as the new global iterate.

And, in the elite pool scheme, select as the new global iterate the best from the set $x_g \cup \{\{x_g^{(1)}\}, \ldots, \{x_{g(p)}\}, \{x_g'\}\}$.

One network system that can be used to implement the distributed co-evolutionary agent problem solving system uses JAVA programming language developed by Sun Microsystems Inc. The implementation executes over multiple processing units distributed over a network. The implementation is based on the use of the VOYAGER object request broker developed by ObjectSpace Inc. as the underlying distributed communications environment. The VOYAGER broker is described in the ObjectSpace VOYAGER ORB 3.3 Developer Guide (2000), incorporated herein in its entirety by reference. The VOYAGER program serves as a middleware layer that provides a location-transparent and standardized environment for execution of the JAVA modules. A significant advantage to using VOYAGER is that it simplifies the task of remote enabling applications modules by automatically adding this feature at run-time, and it supports the inter-node migration of modules. The latter feature is an important requirement for realizing the mobile agents 60 in architecture 10.

As will be readily apparent, there are many applications for the distributed coevolutionary problem solving architecture 10 of the invention. The following provide specific examples of how the distributed coevolutionary problem solving architecture 10 can be used to rapidly provide solutions to complex problems.

Planning new product designs by coordinating between designers, suppliers and manufacturers is a very complex problem which is dependent on many factors, including availability of parts and manufacturing resources, and costs for parts and tooling and assembly and the ability to generate efficient designs.

Figure 2:
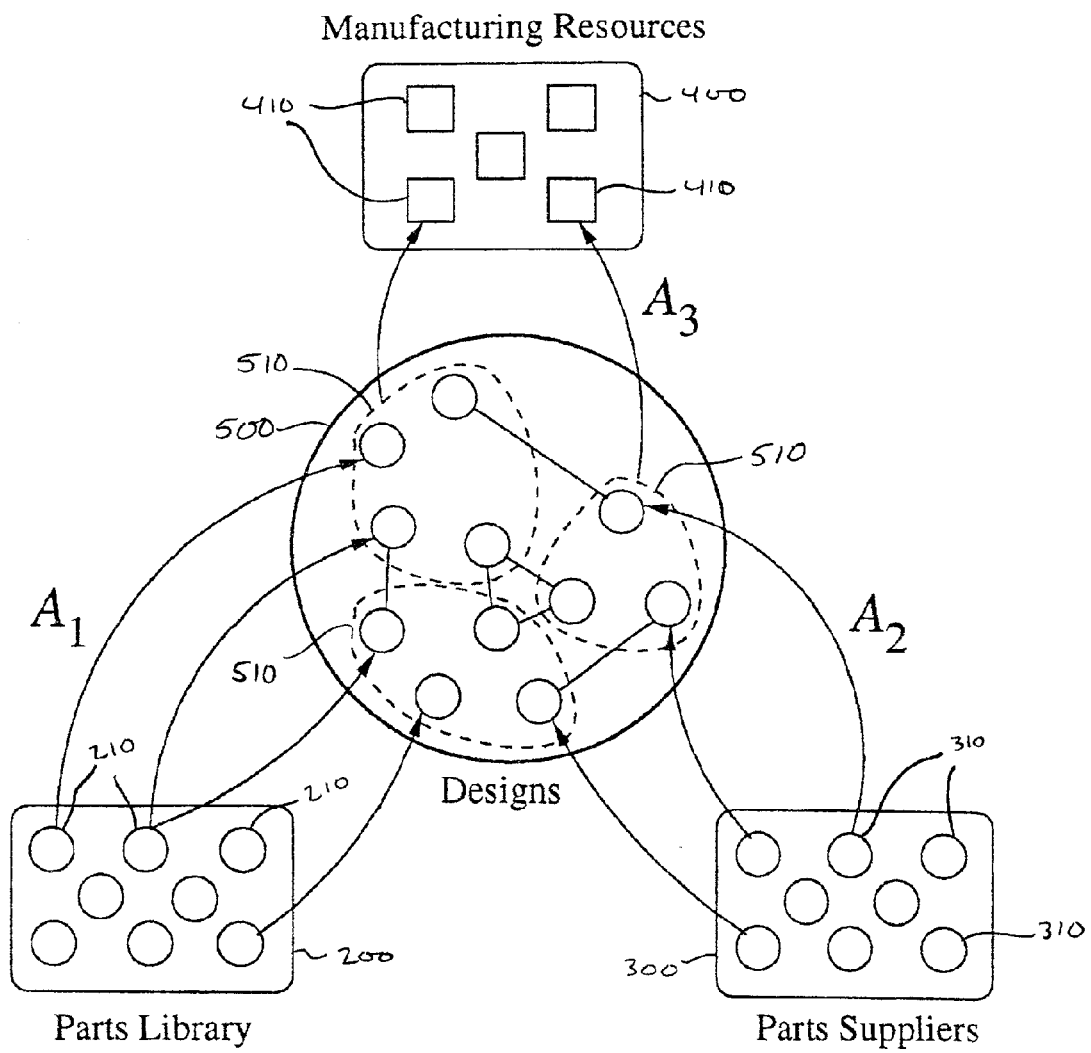
FIG. 2 is a diagram showing the relationship between virtual design problem elements.

FIG. 2 displays a pictorial model of the problem of integrated design, supplier and manufacturing planning for modular products where suppliers and manufacturing resources are network distributed. The mathematical structure of this planning task is given by the equation:

$$\min\{\psi(x): Ax=b, x \in Z_+^n\}$$

where x represents a complete decision vector, $\psi(\cdot)$ is a nonlinear objective function, A is a constraint matrix, and b is a constraint vector.

A decision problem in this formulation consists of three assignment problems, $A_1$, $A_2$, and $A_3$, as represented by the corresponding arrows in FIG. 2. The assignment problem $A_1$ is the assignment of parts 210 from parts library 200 to one or more designs 510 in a pool 500 of possible designs. Assignment problem A2 is the assignment of suppliers 310 from a list of available suppliers 300 who can supply the parts 210 for a given design 510. Assignment problem $A_3$ is the assignment of designs 510 to available manufacturers 410 in a manufacturing resource pool 400.

As will be apparent, each of the assignments in each assignment problem $A_1$, $A_2$, $A_3$ contributes to the overall product cost and product realization time. Further, each assignment has a non-linear effect on the cost and time; that is, the effect cannot be evaluated as weighted sums. The assignment problem triple ($A_1$, $A_2$, $A_3$) constitutes a set of highly coupled problems and each of the assignments cannot be considered independent of the others. Product cost is computed as an aggregate of the cost of parts 210 in a given design 510 and the cost of manufacturing the design 510, while product realization time is computed as an aggregate of the cost of parts supply lead time and time to manufacture the design 510. The overall objective function that is to be minimized is an heuristic weighting of the product cost and an exponential function of the product realization time, as given by:

$$\psi(x)=C(x)e^{(T(x)-\alpha)/\beta}$$

where C(x) and T(x) respectively represent the product cost and product realization time for a complete design-supplier-manufacturing assignment x, and $\alpha$ and $\beta$ are non-zero constants.

Figure 3:
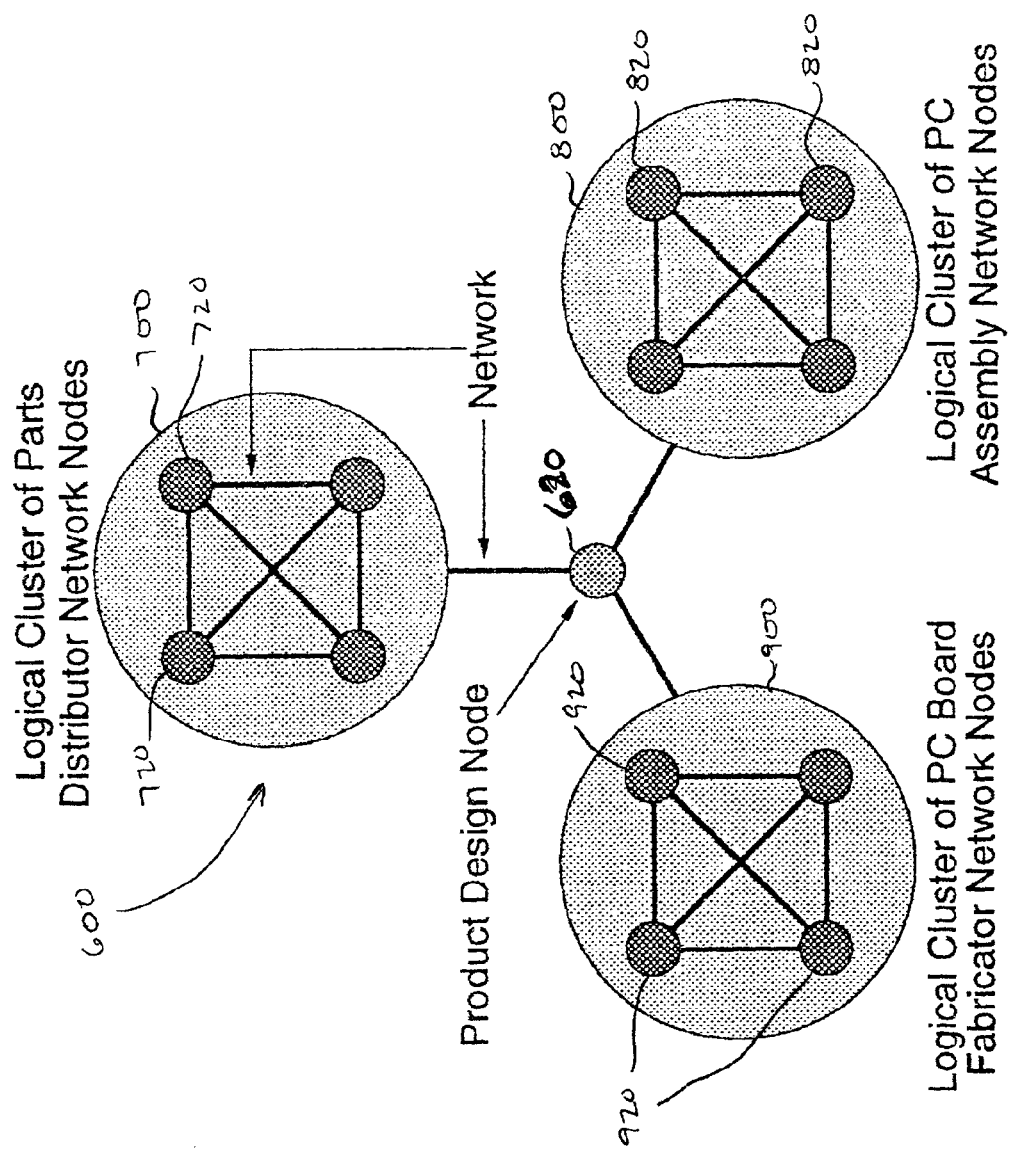
FIG. 3 is a diagram of a network for solving design problems using the invention.

FIG. 3 illustrates the organization of a networked environment 600 used to solve the problem depicted in FIG. 2 in the context of printed circuit board assemblies. The networked environment 600 of FIG. 3 is depicted as a high-level configuration that consists of several logical clusters 700, 800, 900 of network nodes 720, 820 and 920 and a product design node 620. The nodes 720, 820, 920 in each logical cluster 700, 800, 900 correspond to a class of functionally equivalent resources, and typically are physically distributed across the entire network 600. In FIG. 3, the logical clusters 700, 800, 900 correspond to parts distributor nodes 720, printed circuit board fabricator nodes 920 and printed circuit assembly nodes 820.

Each parts distributor nodes 720 in the parts distributor logical cluster 700 corresponds to a parts distributor or parts warehouse that stocks components parts from several manufacturers. Each node 920 in the printed circuit board (PCB) fabricator logical cluster 900 corresponds to a PCB manufacturer having one or more PCB manufacturing lines. Each printed circuit assembly node 820 of the printed circuit assembly logical cluster 800 corresponds to a manufacturing facility having alternative manufacturing lines, each of which is capable of manufacturing printed circuit assemblies given a design, or collection of parts, and an associated PCB to assemble the parts on.

The product design node 620 generates functional specifications that serve as partial templates for virtual designs. While the search at a parts distributor node 720 is over the space of functionally equivalent designs and is achieved by selecting alternative parts and suppliers for those parts, the search at a PCB fabricator node 920 is over the space of available board manufacturing resources, and the search at a printed circuit assembly node 820 is over the space of available assembly resources. Mobile agents 60 (not shown in FIG. 3) communicate results between the various nodes 620, 720, 820, 920, so that the final minimized result can be obtained from any of the nodes 620, 720, 820, 920.

Another application of the distributed coevolutionary problem solving invention is in the context of an Internet or World Wide Web (WWW) search engine. Presently, the WWW as it is commonly known consists of a vast collection of diverse information which is estimated to be about 1.5 billion documents large and growing. A large percentage of that material is available in the form of Web pages whose content is organized according to a markup protocol, such as XML or HTML. Web pages frequently provide content-dependent links to other Web pages, and their organization may be visualized as a graph whose nodes are the Web pages, and whose edges, or connections between nodes, are the links between pages.

Searching and organization of Web pages for rapid retrieval has been the critical focus of contemporary search engines, and without these search engines most of the information on the Web would be inaccessible to users. Known search engines are essentially user-queryable centralized databases which contain indexed maps of the information on the WWW. The indices in the databases are populated and refreshed on a periodic basis by "crawlers" or "spiders" or "bots" that retrieve and parse Web pages by visiting nodes (pages) and following the edges (links) between nodes. Essentially, these crawlers employ one of many graph search techniques in an attempt to traverse, retrieve, and organize distributed content based on index terms.

In addition to Web pages, there are also many searchable dynamic databases reached through individual Web pages which process directed queries posed at the entry Web page. Current crawlers are incapable of accessing and conducting searches on the content of these databases. The large size and dynamic qualities of these databases make it impractical for a crawler to index them, because it effectively requires replicating the database in the crawler search engine database, and constant change would quickly make the search engine database out of date. Further, most crawlers are not capable of making the structured, directed queries necessary to locate information in the dynamic databases.

It is generally accepted that the WWW follows a widely distributed multi-database architecture. To a local user, any single database in the WWW environment appears as a centralized repository, while it appears as a distributed collection of databases to a global user who wants to access coupled content from several databases.

The following describes the application of the coevolutionary problem solving method of the invention to a dynamic retrieval and globally optimal organization, viewed from the perspective of search relevance, of logically interrelated information distributed across several WWW databases.

First, assume there is a space of p database nodes available on the WWW. Let a query $q=(q_1, q_2, \ldots, q_p)$ represent a partition and assignment of q over each of the p nodes. Let $\chi_i$ be the space of local results at node i due to sub-query $q_i$. As a consequence, $\chi$ is the product space of results $\chi = \Pi^p_{i=1} \chi_i$. Let $x = (x_1, x_2, \ldots, x_p) \in \chi$ represent a specific result.

The planning problem is then written as:

$$\min\{\psi(x): x=(x_1, \ldots, x_p), x_i \in \chi_i \forall_i$$

where $\psi(\cdot)$ is a metric that measures the search relevance of a global result. This problem can visualized as the search for an optimal space of joint results from a Cartesian space of result tuples, wherein optimality is measured with respect to the search relevance of global results.

The organization of the networked environment for the database search application is naturally a collection of nodes over which the coevolutionary search process executes using the planning problem as a foundation. Coevolutionary agents are created with programming to evaluate the planning problem and distributed to each of the collection of nodes.

Nevertheless, there is an advantage to consider a networked environment of logical node clusters (similar to that of FIG. 3), wherein each logical cluster represents a certain topic-based specialization of available information. The role of the product design node 620 of FIG. 3, for example, in the search engine application would be the node at which the user is resident and generates the search queries.

The coevolutionary agents are created as a result of the user formulating search queries and local searches are performed by coevolutionary agents at each node 620, 720, 820, 920. Following the initial local searches based on the primary search variables and updating the evolutionary agent solutions with the local search results (the primary search variables), mobile agents are used to communicate the results of the local searches to the other coevolutionary agents resident at the other nodes 620, 720, 820, 920 in the system architecture. The coevolutionary agents are updated with the transported local search solutions (the secondary search variables for the agents at different nodes) from where the using one of the coordination schemes discussed above. The search and updating steps may be repeated to produce evolved solutions which are further optimized based on the underlying algorithm and are superior to those of prior generations.

Although the distributed coevolutionary problem solving method is discussed in terms of producing printed circuit boards and conducting database searches, clearly, the method is adaptable to solving other complex, coupled manufacturing or delivery problems or performing distributed database searches across any collection of distributed sources.

While a specific embodiment of the invention has been shown and described in detail to illustrate the application of the principles of the invention, it will be understood that the invention may be embodied otherwise without departing from such principles.

What is claimed is:

1. A method for efficiently solving an optimization problem having coupled variables distributed across a computer network architecture comprising at least two nodes each having local databases, the method comprising:

providing an optimization algorithm;

creating a plurality of coevolutionary agents implementing the optimization algorithm to provide a cooperative solution to said optimization problem, each coevolutionary agent having a primary search variable and at least one secondary search variable, the plurality of coevolutionary agents distributed across the at least two nodes in the network architecture and the primary search variable of each coevolutionary agent corresponding to one of the at least one secondary search variables of the remaining coevolutionary agents;

conducting concurrent and cooperative local searches using each coevolutionary agent at the corresponding one of the nodes where the coevolutionary agent is located, based on the primary search variable of the coevolutionary agent for producing local solutions using information available from the corresponding one of the local databases;

updating the primary search variable of each coevolutionary agent based on the corresponding one of the local solutions;

providing a plurality of mobile agents at the at least two nodes;

using the plurality of mobile agents to transport the local solutions produced at each node having a coevolutionary agent to all of the other nodes; and updating the at least one secondary search variable of each coevolutionary agent using local solutions transported by the mobile agents using a coordination scheme.

2. A method according to claim 1, further comprising repeating conducting concurrent and cooperative searches, updating the primary search variable, using the mobile agents to transport local solutions and updating the at least one secondary search variable to produce an optimized cooperative solution.

3. A method according to claim 2, further comprising accessing the optimized cooperative solution at any one of the at least two nodes.

4. A method according to claim 1, wherein the coordination scheme is selected from the group consisting of local, joint, pool, elite local, elite joint and elite pool schemes.

5. A method for solving a complex problem having multiple interdependent variables in a network-distributed environment comprising a plurality of nodes each having a corresponding local database, the method comprising:

providing an optimization algorithm relating the multiple interdependent variables;

creating a plurality of coevolutionary agents implementing the optimization algorithm to provide a cooperative solution to said complex problem, each coevolutionary agent setting one of the multiple interdependent variables as a primary search variable, the rest of the interdependent variables being defined as secondary search variables for the coevolutionary agent;

distributing the plurality of coevolutionary agents across the plurality of nodes;

conducting concurrent and cooperative local searches using each coevolutionary agent at the corresponding one of the nodes where the coevolutionary agent is located, based on the primary search variable of the coevolutionary agent for producing local solutions from information available from the corresponding one of the local databases;

updating the primary search variable of each coevolutionary agent based on the corresponding one of the local solutions;

providing a plurality of mobile agents in the network-distributed environment;

using the plurality of mobile agents to transport the local solutions produced at each node having a coevolutionary agent to all of the other nodes; and updating the at least one secondary search variable of each coevolutionary agent using local solutions transported by the mobile agents using a coordination scheme.

6. A method according to claim 5, further comprising repeating conducting concurrent and cooperative local searches, updating the primary search variable, using the mobile agents to transport local solutions and updating the at least one secondary search variable to produce an optimized cooperative solution.

7. A method according to claim 6, further comprising accessing the optimized cooperative solution at any one of the plurality of nodes.

8. A method according to claim 5, wherein the coordination scheme is selected from the group consisting of local, joint, pool, elite local, elite joint and elite pool schemes.

9. A system for efficiently solving an optimization problem having coupled variables distributed across a computer network architecture comprising at least two nodes each having local databases, the system comprising:

a plurality of coevolutionary agent means for implementing an optimization algorithm to provide a cooperative solution to said optimization problem, each coevolutionary agent means having a primary search variable and at least one secondary search variable, the plurality of coevolutionary agent means distributed across the at least two nodes in the network architecture and the primary search variable of each coevolutionary agent means corresponding to one of the at least one secondary search variables of the remaining coevolutionary means;

search means for conducting concurrent and cooperative local searches using each coevolutionary agent means at the corresponding one of the nodes where the coevolutionary agent means is located, based on the primary search variable of the coevolutionary agent means for producing local cooperative solutions using information available from the corresponding one of the local databases;

update means for updating the primary search variable of each coevolutionary agent means based on the corresponding one of the local cooperative solutions;

a plurality of mobile agents at the at least two nodes, the plurality of mobile agents transporting the local cooperative solutions produced at each node having one of the plurality of coevolutionary agent means to all of the other nodes; and secondary update means for updating the at least one secondary search variable of each coevolutionary agent means using local cooperative solutions transported by the mobile agents using a coordination scheme.

10. A system according to claim 9, further comprising solution means for accessing an optimized cooperative Solution at any one of the at least two nodes.

11. A system according to claim 10, wherein the coordination scheme is selected from the group consisting of local, joint, pool, elite local, elite joint and elite pool schemes.

12. A system according to claim 9, wherein the coordination scheme is selected from the group consisting of local, joint, pool, elite local, elite joint and elite pool schemes.

13. A system for solving a complex problem having multiple interdependent variables in a network-distributed environment comprising a plurality of nodes each having a corresponding local database, the system comprising:

an optimization algorithm relating the multiple interdependent variables;

a plurality of coevolutionary agents implementing the optimization algorithm for providing a cooperative solution to said complex problem, each coevolutionary agent setting one of the multiple interdependent variables as a primary search variable, the rest of the interdependent variables being defined as secondary search variables for the coevolutionary agent, the plurality of coevolutionary agents being distributed across the plurality of nodes;

search means for conducting concurrent and cooperative local searches using each coevolutionary agent at the corresponding one of the nodes where the coevolutionary agent is located, based on the primary search variable of the coevolutionary agent for producing local solutions from information available from the corresponding one of the local databases;

update means for updating the primary search variable of each coevolutionary agent based on the corresponding one of the local solutions;

a plurality of mobile agents in the network-distributed environment, the plurality of mobile agents transporting the local solutions produced at each node having a coevolutionary agent to all of the other nodes; and secondary update means for updating the at least one secondary search variable of each coevolutionary agent using local solutions transported by the mobile agents using a coordination scheme.

14. A system according to claim 13, further comprising solution means for accessing the optimized cooperative solution at any one of the at least one nodes.

15. A system according to claim 14, wherein the coordination scheme is selected from the group consisting of local, joint, pool, elite local, elite joint and elite pool schemes.

16. A system according to claim 13, wherein the coordination scheme is selected from the group consisting of local, joint, pool, elite local, elite joint and elite pool schemes.

* * * * *